United States Patent
Konno et al.

(10) Patent No.: US 7,381,443 B2
(45) Date of Patent: *Jun. 3, 2008

(54) METHOD FOR FORMING PRINT WITH SURFACE TEXTURES CORRESPONDING TO PRINTED IMAGE

(75) Inventors: Masaaki Konno, Kanagawa (JP); Hiroshi Inoue, Kanagawa (JP); Yoshiro Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 222 days.

This patent is subject to a terminal disclaimer.

(21) Appl. No.: 10/724,894

(22) Filed: Dec. 2, 2003

(65) Prior Publication Data

US 2004/0109989 A1   Jun. 10, 2004

(30) Foreign Application Priority Data

| Dec. 3, 2002 | (JP) | ............................. 2002-350738 |
| Dec. 3, 2002 | (JP) | ............................. 2002-350811 |
| Dec. 3, 2002 | (JP) | ............................. 2002-350885 |

(51) Int. Cl.
*B41M 3/12* (2006.01)
(52) U.S. Cl. .............................. 427/146; 427/8; 427/9; 427/162; 427/261; 427/265; 427/402
(58) Field of Classification Search ................ 427/256, 427/258, 261, 265, 402, 162, 146, 8, 9
See application file for complete search history.

(56) References Cited

U.S. PATENT DOCUMENTS

| 4,504,837 A | * | 3/1985 | Toyoda et al. ................. 346/25 |
| 4,889,560 A | | 12/1989 | Jaeger et al. | |
| 4,940,412 A | * | 7/1990 | Blumenthal ................. 434/267 |
| 4,977,136 A | * | 12/1990 | Fujiwara et al. ............ 503/227 |

(Continued)

FOREIGN PATENT DOCUMENTS

JP    63-286357    11/1988

(Continued)

OTHER PUBLICATIONS

A office Action issued by the Japanese Patent Office on Feb. 27, 2007, with an English language translation pp. 1-4.

*Primary Examiner*—Bret Chen
(74) *Attorney, Agent, or Firm*—Whitham Curtis Christofferson & Cook, P.C.

(57) ABSTRACT

The hard copy has a transparent coat layer which is formed on an image recording surface of a recording medium on a side of which an image is recorded and covers at least a part of the image recording surface. The transparent coat layer has asperities corresponding to three-dimensional information of the image, materials of objects forming the image, or density variation in the surface area of the image. The size, shape, spacing, height or other features of the asperities can be varied. The hard copy creation method records the image on the recording medium on the side of the image recording surface and then forms on the image recording surface the transparent coat layer having the asperities. The hard copy is created by first printing the image, and then forming on the image a transparent coat layer with the asperities.

3 Claims, 7 Drawing Sheets

U.S. PATENT DOCUMENTS

| | | | |
|---|---|---|---|
| 5,223,314 A * | 6/1993 | Watanabe et al. | 428/35.4 |
| 5,252,986 A | 10/1993 | Takaoka et al. | 346/1.1 |
| 5,439,739 A * | 8/1995 | Furukawa et al. | 428/32.23 |
| 5,474,843 A * | 12/1995 | Lambert et al. | 428/32.24 |
| 5,663,755 A * | 9/1997 | Wada et al. | 347/176 |
| 6,010,808 A * | 1/2000 | Naito et al. | 430/19 |
| 6,095,566 A * | 8/2000 | Yamamoto et al. | 283/75 |
| 6,795,209 B1 * | 9/2004 | Patton et al. | 358/1.18 |
| 2004/0189774 A1 * | 9/2004 | Uejima | 347/102 |

FOREIGN PATENT DOCUMENTS

| | | |
|---|---|---|
| JP | 03-190778 | 8/1991 |
| JP | 4-74193 | 11/1992 |
| JP | 08-039841 | 2/1996 |
| JP | 11-78084 | 3/1999 |
| JP | 11-078084 | 3/1999 |
| JP | 2001-225459 | 8/2001 |

* cited by examiner

METHOD FOR FORMING PRINT WITH SURFACE TEXTURES CORRESPONDING TO PRINTED IMAGE

BACKGROUND OF THE INVENTION

1 Field of the Invention

The present invention belongs to a technical field of a hard copy such as a photographic print and a hard copy creation method. In particular, the present invention relates to a high-quality hard copy in which textures of objects forming an image such as a stereoscopic effect or textures of an image are preferably represented, and a creation method for this hard copy.

Various proposals have been made in order to improve textures of photographic prints, hard copies outputted by various types of printers, and the like to create products with high added values.

For example, JP 3-190778 A discloses a thermal printer using transfer paper applied with a sublimation dye, which can create a recorded image having desired gloss or matte by providing an area formed of a material different from the sublimation dye in the transfer paper and reheating an image via this area.

In addition, JP 8-39841 A discloses a method of representing gloss of a hard copy image freely according to the glossiness of a printed image by, in creation of a hard copy by a thermal transfer printing apparatus, photographing a subject in two kinds of states in which reflected light from the subject is large and small, respectively, to obtain image signals, subtracting the image signal of the state in which the reflected light is small from the image signal of the state in which the reflected light is large to generate a gloss signal, printing an image of the subject on a recording medium using image signals obtained by photographing the subject with the same image pickup means, creating a hard copy of the image of the subject turned into image signals, and thereafter further reheating the hard copy (image) according to the gloss signal.

According to these methods, glossiness or non-glossiness can be given to an image reproduced on a hard copy.

However, the method disclosed in JP 3-190778 A is a method for giving gloss or matte to an image consisting of a sublimation dye by reheating the image via an area of a material different from the sublimation dye. On the other hand, the method disclosed in JP 8-39841 A is a method for giving gloss to an image by melting a color material forming the image.

Therefore, both the methods can give gloss to a desired part of an image, but can only represent gloss as textures of the objects forming the image (i.e., light reflectivity of objects in the image) and cannot represent other textures.

In other words, in order to obtain a hard copy with a high added value, in addition to such textures, an image is preferably represented three-dimensionally in view of the depth of the image (scene), relative positions of objects, and a stereoscopic effect of the objects. However, such a stereoscopic representation cannot be realized by any of the above methods.

In addition, as described above, the method disclosed in JP 3-1990778 A only reheats a desired area of an image consisting of a sublimation dye via an area formed of a material different from the sublimation dye. Thus, glossiness or non-glossiness suitable for an image cannot be given.

On the other hand, as described above, the method disclosed in JP 8-39841 A gives glossiness to an image by generating a gloss signal and melting a color material forming the image. Therefore, desired glossiness can be given to a desired part of the image.

However, the method disclosed in JP 8-39841 A requires special photographing of a subject for obtaining a gloss signal separately from photographing of the subject for reproducing an image. Moreover, with this method, it is necessary to make preparation from a photographing state in order to output an image having desired glossiness. In other words, desired glossiness or non-glossiness cannot be given to an image which has already been outputted.

SUMMARY OF THE INVENTION

It is a first object of the present invention to solve the problems of the related art and to provide, in a hard copy such as a photographic print, a hard copy which can preferably represent a stereoscopic effect of an image such as depth of the image corresponding to a photographed scene or the like, relative positions of objects forming the image such as a subject, and a stereoscopic effect of the objects, and can also preferably represent not only glossiness or non-glossiness but also textures of various materials such as cloth and paper, and a creation method for this hard copy.

In addition, it is a second object of the present invention to solve the problems of the related art and to provide a creation method for a high-quality hard copy which, in a hard copy such as a photographic print, can preferably represent textures of objects forming an image such as metal, cloth, or wood.

Further, it is a third object of the present invention to solve the problems of the related art and to provide a hard copy creation method with which, in a hard copy such as a photographic print, light reflectivity corresponding to surface characteristics of objects forming an image can be given to the hard copy to thereby create a high-quality hard copy which preferably represents textures of a subject and the like.

In order to attain the above-described first object, the first aspect of the present invention provides a hard copy comprising: a recording medium on which an image is recorded on a side of an image recording surface; and a transparent coat layer which is formed on said image recording surface and covers at least a part of said image recording surface, wherein said transparent coat layer has asperities corresponding to three-dimensional information of said image.

Also, in order to attain above-described first object, the second aspect of the present invention provides a hard copy creation method comprising: recording an image on a recording medium on a side of an image recording surface; and forming on said image recording surface a transparent coat layer having asperities corresponding to three-dimensional information of said image so as to cover at least a part of said image recording surface, thereby creating a hard copy.

In the first and second aspects of the present invention, it is preferable that said three-dimensional information is one or more of information on positions of objects forming said image, information on depths of surfaces of said objects, information on directions of the surfaces of said objects, and information on edge portions of said objects, and a state of said asperities of the transparent coat layer is determined in correspondence with positions of said objects.

Preferably, said state of said asperities of the transparent coat layer is controlled by one or more of a difference of height in said asperities, a formation frequency of said asperities, a formation density of said asperities, a aggregation pattern of said asperities, and a thickness of said transparent coat layer.

In the second aspect of the present invention, it is preferable that said image is recorded by modulating an image recording unit according to digital image data, and said three-dimensional information accompanies said digital image data.

Preferably, said image to be recorded on said recording medium on the side of said image recording surface is adjusted according to said three-dimensional information.

In order to attain above-described second object, the third aspect of the present invention provides a hard copy creation method comprising: recording an image on a recording medium on a side of an image recording surface; and forming a transparent coat layer on a designated area of said image recording surface using shape data of asperities which is created in advance according to materials of objects forming said image, thereby creating a hard copy.

Preferably, said recording step of said image is performed by modulating a image recording unit according to digital image data, and an image obtained by reproducing said digital image data as a visible image is displayed for indication of said designated area.

Preferably, said formation of said transparent coat layer with respect to said designated area is performed according to a result of area extraction by analysis of said digital image data.

Preferably, said shape data of said asperities is created in correspondence with one or more of a metal type material, a resin type material, a cloth type material, and a wood type material.

Preferably, said shape data said asperities has one or more of information concerning a difference of height in said asperities of said transparent coat layer, a formation frequency of said asperities of said transparent coat layer, a formation density of said asperities of said transparent coat layer, a coagulation pattern of said asperities of said transparent coat layer, and a thickness of said transparent coat layer.

In order to attain above-described third object, the fourth aspect of the present invention provides a hard copy creation method comprising: analyzing two-dimensional image data to extract a surface area of an image to be reproduced or having been reproduced from said two-dimensional image data and detect density variation in the thus extracted surface area of said image; and forming, on at least a part of an image recording surface of a hard copy in which said image reproduced from said two-dimensional image data has been recorded, a transparent coat layer having asperities corresponding to the thus detected density variation in the extracted surface area of said image in correspondence with said extracted surface area of said image.

Preferably, said two-dimensional image data is obtained by photoelectrically scanning said image recorded in said hard copy.

Preferably, said two-dimensional image data comprises two-dimensional image data from which said image recorded in said hard copy is reproduced.

Preferably, said surface area having larger density variation has a larger size of said asperities of said transparent coat layer corresponding to said surface area.

Preferably, said at least a part of the image recording surface of said hard copy corresponds to the extracted surface area of said image.

In order to attain above-described second object, the fifth aspect of the present invention also provide a hard copy comprising: a recording medium on which an image is recorded on a side of an image recording surface; and a transparent coat layer which is formed on a designated area of said image recording surface using shape data of asperities which is created in advance according to materials of objects forming said image.

In order to attain above-described third object, the sixth aspect of the present invention also provides a hard copy creation method comprising a hard copy comprising: a recording medium on which an image reproduced from two-dimensional image data is recorded on a side of an image recording surface; and a transparent coat layer which is formed on at least a part of the image recording surface, wherein said transparent coat layer has asperities corresponding to density variation detected in a surface area extracted from the image recording surface of said image by analyzing said two-dimensional image data and said at least a part of the image recording surface corresponds to said extracted surface area.

DETAILED DESCRIPTION OF THE PREFERRED EMBODIMENTS

A hard copy and a creation method therefor according to the present invention will be hereinafter described in detail on the basis of preferred embodiments shown in the accompanying drawings.

First, with reference to FIGS. 1 to 3, a hard copy according to a first aspect of the present invention and a hard copy creation method according to a second aspect of the present invention will be described.

Figure 1:
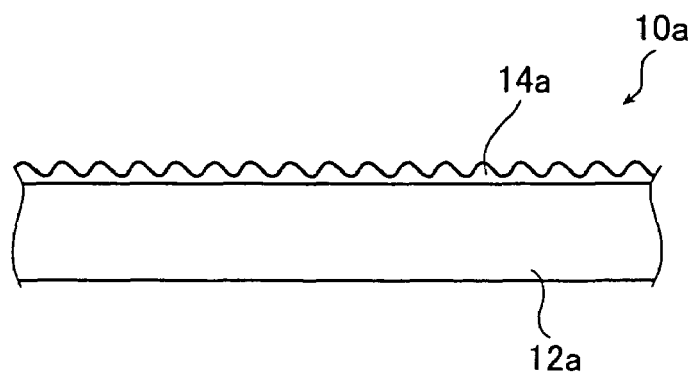
FIG. 1 is a sectional view schematically showing an embodiment of a hard copy according to a first aspect of the present invention.

FIG. 1 shows a schematic sectional view of an embodiment of a hard copy according to the first aspect of the present invention which is created in accordance with the hard copy creation method according to the second aspect of the present invention.

As shown in FIG. 1, a hard copy 10a of this aspect is basically constituted by forming a transparent coat layer 14a, as an upper layer, on an image recording surface of a recording medium 12a, which serves as a base and has an image recorded therein. This transparent coat layer 14a has asperities conforming to the image recorded in the recording medium 12a. The asperities as used herein refer to projected portions or recessed portion, or both. With such a constitution, the present invention enables not only textures of objects of the image such as gloss but also a stereoscopic effect of the image to be preferably represented in various kinds of hard copies 10a.

The transparent coat layer 14a may function as a cover or a protective layer of the image recording surface of the recording medium 12a.

In the present invention, there is no particular limitation on the recording medium 12a to be a basis of the hard copy 10a, and various kinds of hard copies such as a photographic print, various kinds of printed materials, and prints outputted by various types of printers such as an ink-jet printer and an electrophotographic printer are all usable as the recording medium 12a.

Note that, in the case in which a photographic print is used as the recording medium 12a, the hard copy 10a of the present invention can be of a high-quality print which appropriately represents a stereoscopic effect of an image such as depth of the image, relative positional relations among objects in the image, and stereoscopic effect of the objects.

In addition, a material forming the transparent coat layer 14a is not specifically limited. Various materials such as (meta) acrylic resin, phase change ink, and polymeric ink are usable as long as the materials are transparent and do not disturb observation of an image recorded in a recording medium.

The transparent coat layer 14a having asperities conforming to an image can be formed by various methods suitable for its materials or the like. The method of forming the transparent coat layer 14a is described later in detail.

Note that, in the present invention, as in an illustrated case, the transparent coat layer 14a is not limited to one which is directly formed on the surface (on the image recording surface) of the recording medium 12a such as a photographic print and a printed material. For example, a gloss layer, a matte layer, or the like may be formed on an image recording surface before the transparent coat layer 14a is formed thereon.

In addition, the transparent coat layer 14a is not limited to one covering the entire surface of the recording medium 12a (entire area of the image recording surface) but may be a transparent coat layer 14a which is formed so as to cover an appropriately selected part in an image. For example, the transparent coat layer 14a may be formed only in areas of a base 20, and rectangular parallelepipeds 22, 24, and 26 in an image shown in FIG. 2 to be described later. Moreover, the transparent coat layer 14a is not limited to one which covers the whole of an area where the layer 14a is to be formed, and a lower surface such as the image recording surface may be partially exposed from the transparent coat layer 14a. In addition, the transparent coat layer 14a may be formed in an uneven shape by forming a large number of independent projected portions.

As described above, in the present invention, the transparent coat layer 14a has asperities conforming to an image recorded in the recording medium 12a. More specifically, for example, in a photographic print, the transparent coat layer 14a has asperities corresponding to three-dimensional information of various objects (including a background) forming an image (subject, etc.). Consequently, a stereoscopic effect of the image such as depth effect of the image, relative positions of the objects forming the image, and a stereoscopic effect of the objects can be represented preferably.

A method of determining the unevenness of asperities corresponding to three-dimensional information of an image is not specifically limited. As a preferred example, states of asperities at individual positions of the transparent coat layer 14a are determined for their corresponding positions in an image according to at least one of positions of objects forming the image, depths of surfaces of the objects, directions of the surfaces, and edge portions of the objects. The method of determining the unevenness of asperities of the transparent coat layer 14a will be hereinafter described with reference to FIG. 2.

Figure 2:
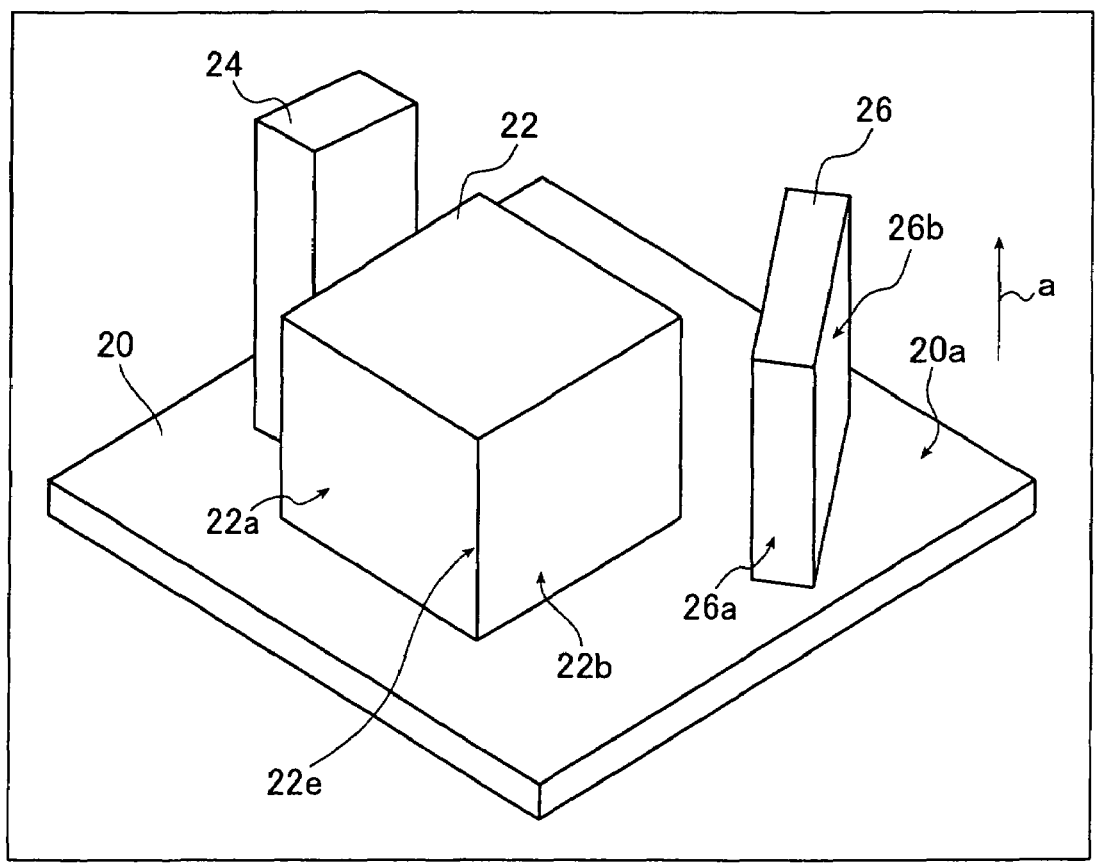
FIG. 2 is a conceptual diagram for explaining the hard copy according to the first aspect of the present invention.

FIG. 2 is a perspective view schematically showing an example of an image of a scene in which three objects, namely, the rectangular parallelepipeds 22, 24, and 26, are mounted on the base 20.

Here, looking at the rectangular parallelepiped 22 and the rectangular parallelepiped 24, the rectangular parallelepiped 22 is located further on the front side than the rectangular parallelepiped 24. According to this position, the transparent coat layer 14a covering the area of the rectangular parallelepiped 24 existing on the back side is set to have large asperities compared with the transparent coat layer 14a covering the area of the rectangular parallelepiped 22 existing on the front side. In other words, an object existing on the front side is reproduced in a glossy tone and an object existing on the back side is reproduced in a matte tone. Alternatively, in the case in which the object existing on the front side has an uneven surface, the degree of unevenness of the transparent coat layer 14a covering the area of the object existing on the front side is increased to further emphasize the matte tone.

In a recorded image, the degree of unevenness of the transparent coat layer 14a is determined in this way to reproduce the object existing on the front side in the glossy tone and make it clear or emphasize characteristics of the object existing on the front side to blur characteristics of the object existing on the back side. Consequently, a stereoscopic effect of the image such as depth effect of the image and the relative positions of the objects can be represented.

Looking at an upper surface 20a of the base 20, in the image, a front side is at the bottom and a back side is at the top along an arrow "a".

In correspondence with this, in the case in which this upper surface 20a is an uneven surface, the transparent coat layer 14a covering this area is given asperities, and the degree of unevenness is gradually decreased from the front side toward the back side. In other words, the matte tone of the upper surface 20a is gradually weakened from the front side toward the back side. Conversely, in the case in which the upper surface 20a is an even surface, the glossy tone is emphasized and asperities are not formed on the front side, and the degree of unevenness is gradually increased toward the back side such that characteristics inherent in objects are gradually blurred toward the back side.

In this way, the state of unevenness of the transparent coat layer 14a is determined according to the depth of surfaces of an object in the recorded image, whereby a stereoscopic effect of the image can be represented effectively.

Looking at the rectangular parallelepiped 22 and the rectangular parallelepiped 26, a surface 22a and a surface 22b of the rectangular parallelepiped 22 have an angle of around 45° with respect to the recorded image, and a surface 26a and a surface 26b of the rectangular parallelepiped 26 have an angle of about 90° and an angle of about 0°, respectively with respect to the recorded image.

In correspondence with this, in the case in which each surface is, for example, an uneven surface, the degree of unevenness of the transparent coat layer 14a is increased in the areas corresponding to the surface 22a and the surface 22b of the rectangular parallelepiped 22, and the degree of unevenness of the transparent coat layer 14a is reduced in the areas corresponding to the surface 26a and the surface 26b of the rectangular parallelepiped 26. In a general scene, characteristics inherent in a surface is observed conspicuously when an angle of the surface with respect to an observer is closer to 45° and, conversely, characteristics of a surface with an angle of 0° or 90° are less conspicuous. Therefore, the degree of unevenness of the transparent coat layer 14a is determined according to the direction (angle) of a surface of an object such that characteristics of a surface having an angle close to 45° are conspicuous and, conversely, characteristics of a surface having an angle close to 0° or 90° are blurred. Consequently, directions and the like of objects forming the recorded image can be emphasized, and a stereoscopic effect of the image can be represented.

Moreover, the rectangular parallelepiped 22 has an edge portion 22e formed by the surface 22a and the surface 22b.

In the surface 22a and the surface 22b near the edge portion 22e, the degree of unevenness of the transparent coat layer 14a is increased (no asperities are given to the edge portion 22e) or the state of unevenness of the transparent coat layer 14a is varied on the surface 22a and the surface 22b to make textures of both the surfaces different. The state of unevenness of the transparent coat layer 14a is determined in this way, whereby the edge portion 22e can be highlighted, a stereoscopic effect of the objects forming the recorded image can be further emphasized, and a stereoscopic effect of the image can be represented.

As described above, the state of unevenness at each position of the transparent coat layer 14a is determined according to a three-dimensional constitution of an image, whereby a stereoscopic effect of the image is preferably represented. In addition to this, textures of objects may be represented by determining the state of unevenness according to surface properties of the objects.

For example, surface reflection data of objects in an image is found in advance, and in accordance with the data, the degree of unevenness of the transparent coat layer 14a on a surface with a large specular reflection component is reduced, and the degree of unevenness of the transparent coat layer 14a is increased on a surface with a large diffuse reflection component according to the amount of diffuse component. In this way, the state of unevenness of the transparent coat layer 14a is determined, whereby textures of the objects can be represented.

At least one of the hue variation and density variation of an object forming an image is found in advance, and the degree of unevenness is increased in an area with larger variation based on the degree of the variation.

A surface with large hue or density variation is a surface with a large likelihood of having a large number of reflection components. Therefore, the state of unevenness of the transparent coat layer 14a is adjusted, for example, sizes of the asperities in a corresponding area of the transparent coat layer 14a are determined according to this variation, whereby textures of the objects can be preferably represented.

In the present invention, the method of determining the state of unevenness of an asperity to be formed at each position of the transparent coat layer 14a in correspondence with an image is not limited to the above-described methods. Various other kinds of information and states of an image can be used.

For example, in general, a surface with a large area in an image is often located on the front side and a surface with a small area is often located on the back side. Therefore, there is preferably illustrated a method of emphasizing characteristics with asperities to be formed in the transparent coat layer 14a according to the position (the back side or the back side in the image) of the object, assuming that an object with a large area is located on the front side and, conversely, blurring characteristics assuming that an object with a small area is located on the back side.

In addition, an area with a low brightness in an image is considered to be an area where light is diffused. Therefore, it is also preferable to adopt a method of reducing the degree of unevenness at an edge portion or a portion with high brightness according to the brightness of an image such that the portion has a glossy property, and increasing the degree of unevenness of the asperities to be formed in the transparent coat layer 14a such that the portion has a non-glossy property as the brightness decreases.

Moreover, it is also preferable to assume a specular reflection portion from information on a light source or image data to be described later and reduce the degree of unevenness of this portion such that the portion has a glossy tone.

In the present invention, it is preferable to determine the state of unevenness at each position of the transparent coat layer 14a corresponding to the position in an image in a composite manner taking into account plural requirements rather than determining the state according to one of these requirements.

In the above-mentioned example, two or more of factors including position of an object in an image, depth and direction of a surface, reflection state of the surface, and hue or density variation of the surface are detected, weight is given to each factor to calculate a total sum of evaluation values, and the state of unevenness of an asperity to be formed on the surface of the transparent coat layer 14a is determined in correspondence with each position in the image on the basis of the calculated evaluation value.

For example, when the position of the object in the image is indicated by 1, the depth of the surface thereof is indicated by 2, the direction of the surface thereof is indicated by 3, distinction of the edge portion thereof is indicated by 4, the light reflectivity thereof is indicated by 5, and the variation of the density or the like thereof is indicated by 6, and evaluation values indicating the degree of unevenness in correspondence with the respective requirements are assumed to be f1(x) to f6(x), and coefficients for these evaluation values f are assumed to be a1 to a6, the state of unevenness of an asperity to be formed in each position of the transparent coat layer 14a is determined in correspondence with the image based on the amount A(x) which is calculated by the following expression:

$$A(x)=a1f1(x)+a2f2(x)+ \ldots +a6f6(x)$$

A method of adjusting the state of unevenness of an asperity to be formed in the transparent coat layer 14a such as the size of an asperity is not specifically limited, and various methods can be used.

As an example, there is illustrated a method of adjusting the state of unevenness according to one or more factors selected from difference of height in the asperities, frequency of the asperities, density of the asperities, aggregation pattern of the asperities, and thickness of the transparent coat layer 14a. The difference of height in the asperities is, for example, a height of a projected portion with respect to a recessed portion or a maximum height of the asperities. The frequency of the asperities is, for example, a repetition period at which the projected portions and the recessed portions are formed. The density of the asperities is, for example, the number of projected portions and/or the recessed portions per unit area. The aggregation pattern is, for example, a two-dimensional formation pattern of the projected portions and/or the recessed portions. The thickness of the transparent coat layer 14a is, for example, the thickness of the thinnest portion of the transparent coat layer.

For example, if the difference of height in the asperities of the transparent coat layer 14a is small, the glossy tone is obtained, and as the difference of height in the asperities increases, the matte tone is obtained. Therefore, for example, it is preferable to reduce the difference of height in the asperities to emphasize glossiness for the glossy surface on the front side as described above. Conversely, the difference of height in the asperities is increased to emphasize non-glossiness for the non-gloss surface on the front side. In addition, in the direction of the surface, the difference of height in the asperities is gradually increased toward the back side.

Moreover, in addition to this, more effective representation is possible by appropriately changing the frequency of the asperities. For example, various matte tones can be represented more preferably by making the repetition period of the asperities more frequent in the case in which a strong matte tone is represented and making the repetition period of the asperities less frequent in the case in which a weak matte tone is represented.

Note that the thickness of the transparent coat layer 14a is not specifically limited and a thickness which does not disturb observation of an image can be selected in accordance with the material used in its formation.

In the present invention, these methods are appropriately combined to adjust the state of the transparent coat layer 14a to represent a stereoscopic effect or the like of an image as described above.

In addition, textures peculiar to objects forming an image can also be represented by appropriately combining these methods. For example, when an object is a towel and the like, if the transparent coat layer 14a with Rz (maximum height of the asperities) of about 8 to 12 μm and the period of the asperities of about 300 to 400 μm is formed, textures of the towels and the like can be represented effectively.

Note that the size or the like of an asperity formed on the transparent coat layer 14a is not specifically limited and only has to be determined appropriately according to the type and size of a hard copy (recording medium 12a), materials for use in forming the transparent coat layer 14a, and the like. As an example, it is preferable to adjust Ra (arithmetic average roughness) in the range of about 1 to 20 μm, in particular 2 to 10 μm, and Rz (maximum height of a projected portion) in the range of 5 to 50 μm, in particular 8 to 35 μm.

Figure 3:
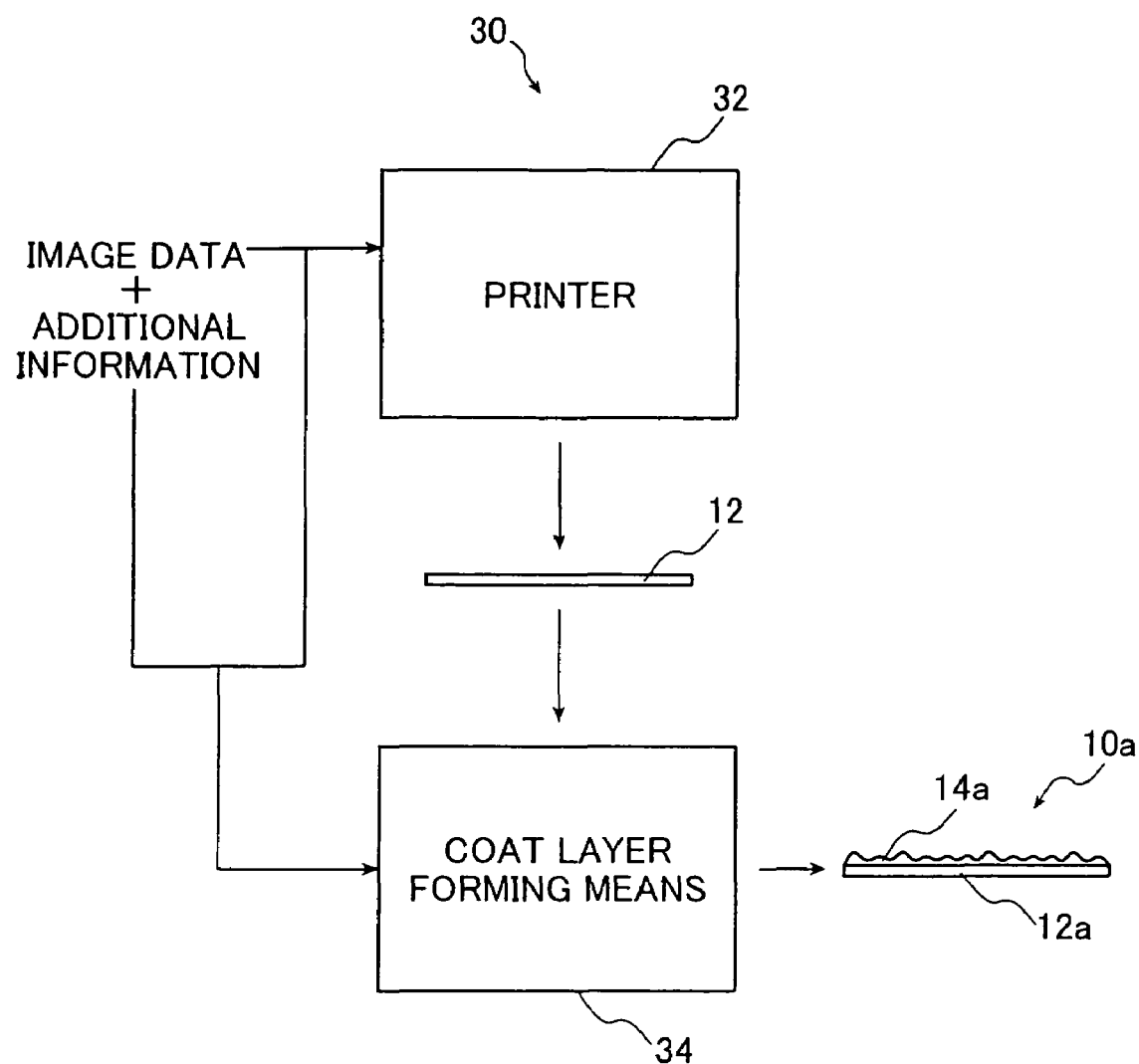
FIG. 3 is a block diagram of an embodiment of an apparatus for carrying out a hard copy creation method according to a second aspect of the present invention.

In FIG. 3, an embodiment of a creation apparatus for carrying out the hard copy creation method according to the second aspect of the present invention to create a hard copy according to the first aspect of the present invention is shown as a block diagram.

An creation apparatus 30 in the illustrated case basically includes a printer 32, which creates the recording medium 12a in which an image is recorded, and transparent coat layer forming means 34 which forms the transparent coat layer 14a on the surface of the recording medium 12a to create the hard copy 10a of the present invention. The creation apparatus 30 creates the hard copy 10a using image data and additional information accompanying the image data.

The image data is image data of a publicly known full-color image compatible with the printer 32, for example, image data suitable for image exposure of three primary colors of red (R), green (G), and blue (B) of photographic paper (photographic sensitive material).

The additional information includes various kinds of information on the asperities of the transparent coat layer 14a corresponding to the image of the image data and is associated with the image data.

In the illustrated case, the additional information includes three-dimensional information of an image corresponding to the method of determining the state of unevenness of the transparent coat layer 14a. Preferably, as described above, the additional information includes one or more kinds of information selected from information on the position of each object forming the image of the image data, information on the depth of the surface of the object, information on the direction of the surface of the object, and information on the edge portion of the object. Further, in addition to these pieces of information, the additional information may include information on the light reflection of the surface of the object, information on at least one of the hue and density variations in the surface of the object, and the like.

For example, such additional information accompanies the image data in correspondence with positional information (pixel number, etc.) of objects forming a reproduced image obtained by reproducing the image data.

Such image data and the additional information accompanying this image data can be generated by various means.

For example, it is only necessary to generate image data for creating the hard copy (image to be recorded in the recording medium 12a) of the present invention and additional information associated with the image data using various kinds of data or information before generating two-dimensional image data which is used for recording of a final 3D image in accordance with the creation of a 3D (three-dimensional) image by a so-called computer graphics. Such data or information to be used includes individual information of each object such as shape, color, and density data of each object forming the image, information on the surface in the image, three-dimensional positional information such as position and direction of an object or the like, light beam information such as information on the light source type and light source position, and the like.

In the present invention, image data itself may have three-dimensional information on an image, or three-dimensional information may be generated by analyzing the image data.

In the creation apparatus 30 of the illustrated case, the image data is supplied to the printer 32, and both the image data and the additional information are supplied to the transparent coat layer forming means 34.

For example, the printer 32 records a latent image on photographic paper (photographic sensitive material) and applies wet-type processing to the photographic paper to output a photographic print as the recording medium 12a.

As a specific example, there is illustrated an output machine of a digital photo print system (digital mini-laboratory) consisting of a recording apparatus and a development apparatus. The recording apparatus scans and exposes photographic paper two-dimensionally by changing three light beams corresponding to R exposure, G exposure, and B exposure as modulated in accordance with supplied image data in a main scanning direction to make them incident on a predetermined exposure position and conveying the photographic paper in a sub-scanning direction perpendicular to the main scanning direction at the exposure position, whereby a latent image is recorded. The development apparatus applies predetermined wet-type processing including development, bleaching/fixing, and washing to the photographic paper on which the latent image is recorded by the recording apparatus and outputs it as the recording medium 12a (photographic print).

Note that, in the present invention, the recording medium is not limited to the photographic print as described above. Therefore, various creation means for a hard copy such as an ink-jet printer and a printing apparatus can be used as the printer 32.

Here, in the present invention, a stereoscopic effect and textures of an image in a hard copy to be created may be further improved by supplying the additional information to the printer 32 as well and using this additional information to adjust the image to be recorded in the recording medium 12a (image data processing).

For example, image processing is performed according to the additional information such that there is a difference in visibility or the like between an object existing in the front side of an image and an object existing in the back side of the image. In addition to this, as described above, a stereoscopic effect can be represented more efficiently by adjusting the state of unevenness of the asperities such that characteristics of the object existing on the front side are exhibited sharply.

In addition, a stereoscopic effect can be represented preferably by highlighting the outline of the object existing on the front side of the image with the image data processing (sharpness processing) according to the additional information. In this case, a stereoscopic effect can be further emphasized by increasing the sizes of the asperities of the transparent coat layer 14a in an area near the edge of the object or also using a method of changing textures of surfaces forming the edge according to the state of unevenness of the transparent coat layer 14a.

In addition, a stereoscopic effect is represented by adding a pseudo shadow to an image through image data processing. In this case, a stereoscopic effect can be further emphasized by adjusting the state of unevenness of the portion of the transparent coat layer 14a corresponding to the shadow portion, for example, increasing the degree of unevenness of the shadow portion to obtain the matte tone.

Moreover, in a portion where the transparent coat layer 14a has large asperities, a specular reflection component from the hard copy 10a is little, and as a result, density of the portion looks low. In order to cope with this problem, in an area where it is estimated from the additional information that the transparent coat layer 14a has large asperities, image data processing is performed to improve recording density and harden gradation ($\gamma$).

Moreover, a stereoscopic effect is represented by hardening the gradation of the object existing on the front side and softening the gradation of the object existing on the back side through image data processing based on the additional information.

In this case, as described above, a stereoscopic effect can also be represented more effectively by adjusting the state of unevenness of the transparent coat layer 14a such that the characteristics of the object existing on the front side are exhibited sharply.

In addition, textures of the image can be represented more effectively by emphasizing the texture of each object surface in the image by the combination of the adjustment of the image by image data processing with the adjustment of the unevenness of the transparent coat layer 14a.

The recording medium 12a is subsequently supplied to the transparent coat layer forming means 34.

As described above, the transparent coat layer forming means 34 determines, according to the supplied image data and additional information, the position on the surface of the recording medium 12a (image surface) where the transparent coat layer 14a is to be formed and the state of unevenness of the transparent coat layer 14a to be formed. In accordance with the determination, the transparent coat layer forming means 34 forms the transparent coat layer 14a having asperities of desired unevenness and outputs the image as the hard copy 10a of the present invention.

Note that, as described above, the transparent coat layer 14a is not limited to one which is formed so as to cover the entire surface of the recording medium 12a, and the formed transparent coat layer is not limited to one which covers the forming area entirely.

In the transparent coat layer forming means 34, the method of forming the transparent coat layer 14a is not specifically limited, and various methods can be used.

As a preferred example, there is illustrated a method in which an image recording method by ink jet system is used to eject droplets of a material for forming the transparent coat layer 14a to the image recording surface of the recording medium 12a with an ink-jet recording head, and to form the transparent coat layer 14a while adjusting the amount of ejection of the droplets per unit area in accordance with the state of unevenness as determined for each position of the transparent coat layer 14a (i.e., an image recorded in the recording medium 12a), to thereby form the transparent coat layer 14a having asperities corresponding to the image data and the additional information.

There is illustrated a method in which an ink-jet printer for recording an image using ink of a solid type which melts by heating, is used to form the transparent coat layer 14a as described above with colorless ink. This method is disclosed in JP 4-74193 B and the like.

Alternatively, it is also possible that a flat transparent coat layer made of a thermoplastic resin is formed on the image recording surface of the recording medium 12a with publicly known means and a recessed portion is formed with a heated needle, thereby forming the transparent coat layer 14a having asperities corresponding to the image data and the additional information. For example, "Millipede" which is an information recording technique developed by IBM Corporation may be applied to the method of forming the recessed portion.

The asperities of the transparent coat layer 14a are not limited to those which are formed only according to the additional information. For example, it is also possible to detect the size of a surface area of an image or brightness of each area through image data analysis to thereby determine the state of unevenness depending on the size and the brightness of the surface area as described above, and to form the transparent coat layer 14*a* according to the determined state of unevenness.

In addition, in forming the transparent coat layer 14*a*, a stereoscopic effect may be represented more preferably by adjusting the shape of the asperities.

For example, a stereoscopic effect may be represented more effectively by forming the transparent coat layer 14*a* which has the projected portions of triangular section and which has a fine inclined surface in one direction such that the edge position, edge density, density, and the like of an image vary with the angle at which the image is observed. In addition, in this case, the sectional shapes of the projected portions are set to be slightly different in lengths of slopes of right triangles or the like, whereby this change by the observation direction can be increased.

In the above examples, the transparent coat layer forming means 34 determines the degree of unevenness in correspondence with the position of the transparent coat layer 14*a* according to the additional information accompanying the image data and forms the transparent coat layer 14*a*. However, the present invention is not limited to this.

For example, the following method is also possible: A recorded image is displayed on a monitor, and an operator watches the image on the monitor or the like to indicate the location on the image and the state of unevenness according to the position of an object, direction of a surface, or the like as described above; then, according to the indication, the transparent coat layer forming means 34 forms the transparent coat layer 14*a* having the asperities with indicated states of unevenness in the indicated locations on the image to create the hard copy of the present invention.

As described above in detail, according to the first and second aspects of the present invention, it is possible to obtain a hard copy such as a photographic print in which a stereoscopic effect of an image such as depth of the image, relative positional relation of objects, or a stereoscopic effect of the objects is represented preferably.

The hard copy in accordance with the first aspect of the present invention and the hard copy creation method in accordance with the second aspect of the present invention are basically constituted as described above.

Next, referring to FIGS. 4 to 8, a hard copy and a hard copy creation method according to the third and fifth aspects of the present invention will be described.

Figure 4:
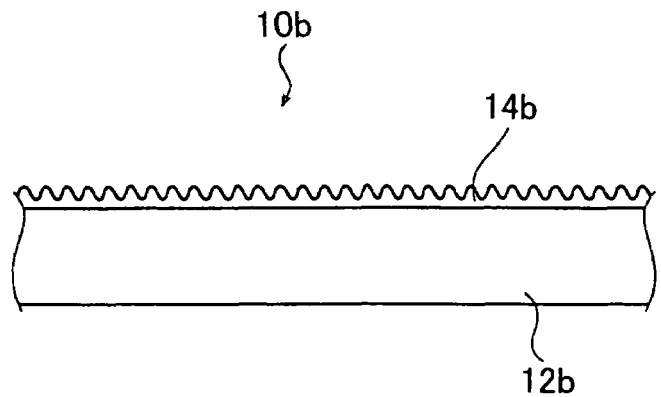
FIG. 4 is a sectional view schematically showing an example of a hard copy (high-quality print) according to a third and fifth aspects of the present invention.

FIG. 4 shows a schematic sectional view of an example of a high-quality print which is a hard copy according to the fifth aspect of the present invention created by applying the hard copy creation method according to the third aspect of the present invention to a photographic print.

A high-quality print 10*b* shown in FIG. 4 is created as a hard copy by the hard copy creation method according to the third aspect of the present invention and is basically constituted by forming a transparent coat layer 14*b*, as an upper layer, on an image recording medium such as a photographic print 12*b* which serves as a base and has an image recorded therein. In addition, this transparent coat layer 14*b* has fine asperities conforming to materials of objects forming the image recorded in the photographic print 12*b* serving as the recording medium. In the present invention, textures of objects forming the image, in particular, textures of materials of the objects are represented by the transparent coat layer 14*b* having such fine asperities.

Note that the transparent coat layer 14*b* may function as a cover or a protective layer of an image recording surface of the photographic print 12*b*.

A recording medium to be a basis of the high-quality print 10*b* which is a hard copy created according to the third aspect of the present invention is not limited to the photographic print 12*b* of the illustrated case. Various printed materials, hard copies or the like outputted by various types of printers such as an ink-jet printer and an electrophotographic printer, and various other kinds of hard copies are all usable as the recording medium.

In addition, a material forming the transparent coat layer 14*b* is not specifically limited as in the case of the first and second aspects of the present invention described above. Various materials such as (meta) acrylic resin, phase change ink, and polymeric ink are usable as long as the materials are transparent and do not prevent observation of an image recorded in a recording medium.

The transparent coat layer 14*b* having fine asperities conforming to the materials of the objects forming an image can be formed by various methods suitable for the materials used for its formation or the like.

The high-quality print 10*b* shown in FIG. 4 and the hard copy 10*a* shown in FIG. 1 are different in the point described below: The high-quality print 10*b* shown in FIG. 4 is a hard copy created by the hard copy creation method according to the third aspect of the present invention, and the transparent coat layer 14*b* thereof has fine asperities conforming to materials of objects forming an image recorded in the photographic print 12*b*. On the other hand, in the hard copy 10*a* shown in FIG. 1, even in the case in which the recording medium 12*a* is a photographic print, the transparent coat layer 14*a* has asperities conforming to an image for representing a stereoscopic effect of the image recorded in the photographic print. However, these are the same in layer structures thereof. In the layer structure of the high-quality print 10*b* in this aspect, the photographic print 12*b* is used as a recording medium of the high-quality print 10*b*, and the transparent coat layer 14*b* having fine asperities is provided on the recording medium 12*b*. On the other hand, in a layer structure of the hard copy 10*a* shown in FIG. 1, the recording medium 12*a* is a photographic print, and the transparent coat layer 14*a* having fine asperities is provided on the recording medium 12*a*.

Figure 5:
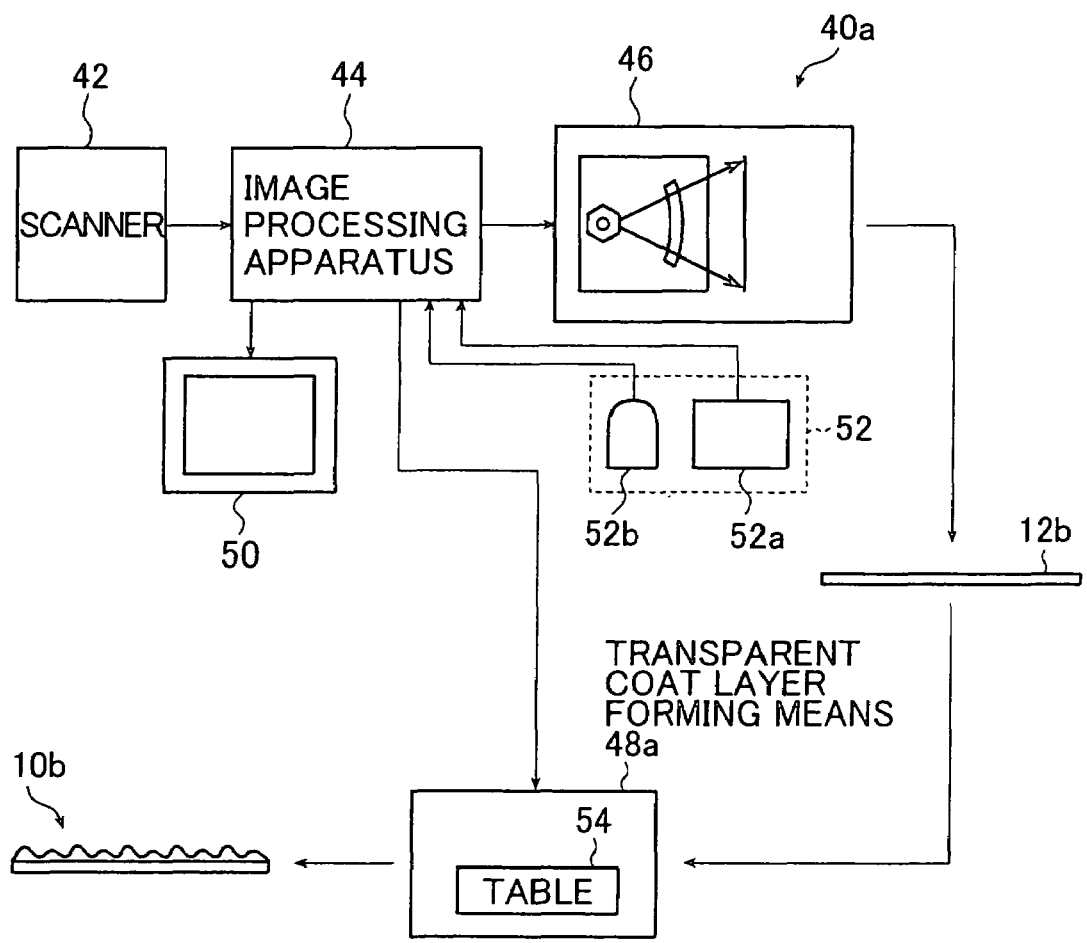
FIG. 5 is a block diagram of an embodiment of a digital photo print system carrying out an embodiment of the hard copy creation method according to the third aspect of the present invention.
Figure 6:
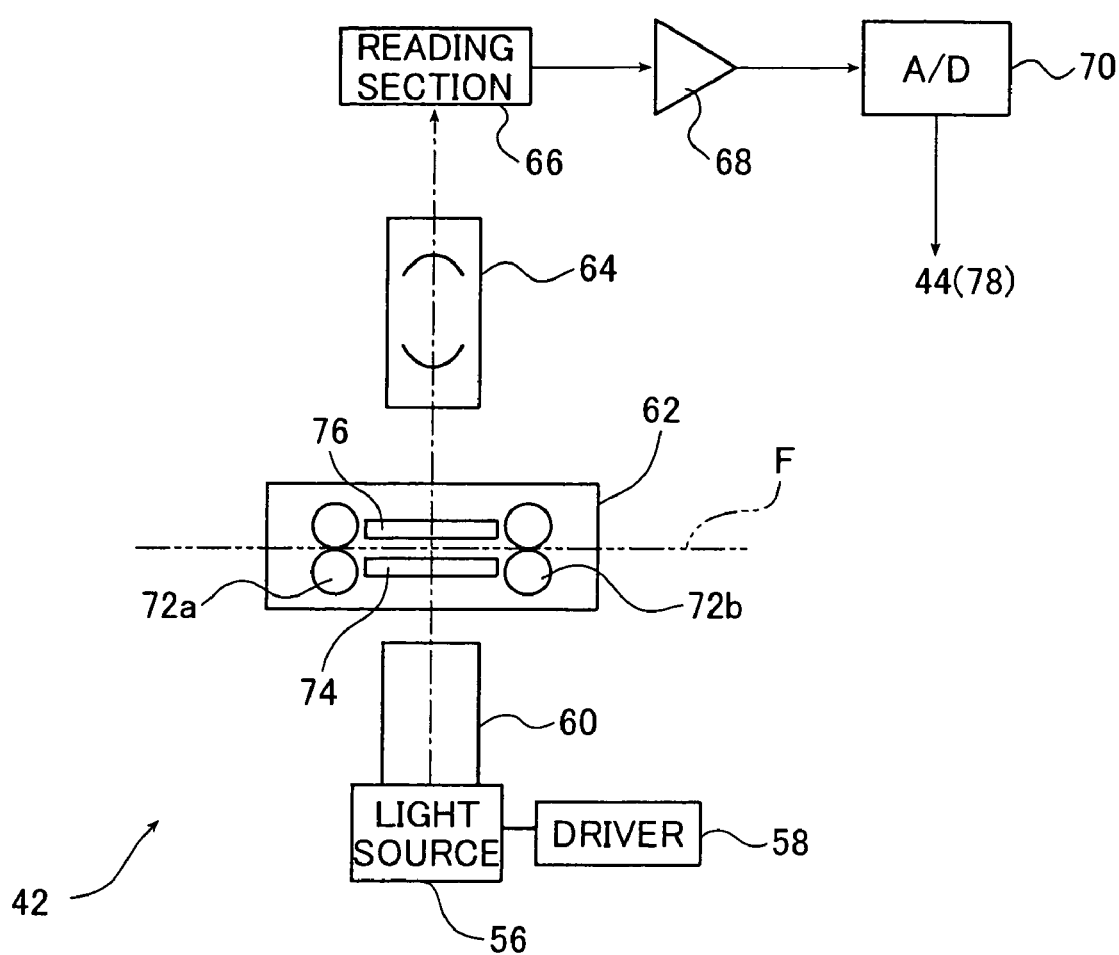
FIG. 6 is a conceptual diagram of an embodiment of a scanner of the digital photo print system shown in FIG. 5.

FIG. 5 shows a block diagram of an embodiment of a digital photo print system which carries out the hard copy creation method according to the third aspect of the present invention to create the high-quality print 10*b*.

A digital photo print system (hereinafter referred to as print system) 40*a* shown in FIG. 5 photoelectrically reads an image photographed on a (photographic) film F or acquires image data (image file) of an image photographed by a digital camera or the like, outputs the photographic print 12*b*, and forms the transparent coat layer 14*b* on the photographic print 12*b* to create the high-quality print 10*b* according to the creation method of the present invention. The print system 40*a* basically includes a film scanner (hereinafter referred to as scanner) 42, an image processing apparatus 44, a printer 46, and transparent coat layer forming means 48*a*.

In addition, a display 50 for performing display or the like of a verification image and an operation system 52 (a keyboard 52*a* and a mouse 52*b*) for performing various indications or the like are connected to the image processing apparatus 44.

Note that in the print system 40*a* of the illustrated example, the scanner 42, the image processing apparatus 44, and the printer 46 constitute a publicly known digital photo print system.

The scanner 42 is an apparatus for photoelectrically reading an image photographed in each frame of the film F. As shown in a conceptual diagram of FIG. 6, the scanner 42 includes a light source 56, a driver 58, a diffusion box 60, a carrier 62, an imaging lens unit 64, a reading section 66, an amplifier 68, and an A/D (analog/digital) converter 70.

In the scanner 42 of the illustrated case, the light source 56 uses LEDs (light emitting diodes) and is constituted by arranging three LEDs emitting R (red), G (green), and B (blue) reading light. The light source 56 is driven by the driver 58 and sequentially emits the R, G, and B reading light.

The diffusion box 60 equalizes the reading light in a surface direction of the film F and includes for example, a quadrangular prism with a mirror in the inside and a diffusion plate or the like closing one surface of the quadrangular prism.

The carrier 62 intermittently carries the film F and sequentially carries each frame (each image) photographed on the film F to a predetermined reading position and holds it in position. Plural types of carriers corresponding to sizes or types of the film F such as those for 135 size and APS (IX240) are prepared. The carrier 62 is detachably attached to a main body of the scanner 42.

In the illustrated case, the carrier 62 basically includes conveyor roller pairs 72a and 72b, a mask 74 which regulates a reading area of each frame in a predetermined reading position, and a mask 76 which also acts as a pressing member for the film F.

The conveyor roller pairs 72a and 72b are publicly known conveyor roller pairs for a film (photograph film) and are arranged so as to be opposed to each other with respect to the predetermined reading position in a conveying direction of the film F. Since the scanner 42 of the illustrated case performs image reading by surface exposure, the conveyor roller pairs 72a and 72b intermittently convey the film F in a longitudinal direction to thereby sequentially convey images photographed on the film F to the reading position frame by frame.

Light (projected light bearing an image) having passed through the frame placed in the reading position is made incident on the imaging lens unit 64. The imaging lens unit 64 is a lens unit for imaging projected light of the film F on the reading section 66 (light-receiving surface of an area CCD sensor).

The reading section 66 is a section for photoelectrically reading an image photographed on the film F using the area CCD sensor, and reads an entire surface of one frame regulated by the mask 54 of the carrier 62 (image scanning by the surface exposure).

An image signal from the reading section 66 is amplified by the amplifier 68 and converted into a digital image signal by the A/D converter 70 and outputted to the image processing apparatus 44.

In reading the film F with the scanner 42, first, the carrier 62 carries a frame to be read in the film F to a reading position where the film F is stopped.

Subsequently, under the action by the driver 58, for example, the LED for R light in the light source 56 is driven to emit the R light. After the amount of R light is equalized in the surface direction of the film F in the diffusion box 60, the R light is made incident on and transmitted through the frame held in the reading position to turn into projected light bearing an image photographed in this frame. This projected light is imaged in the reading section 66 by the imaging lens unit 64, and an R image of this frame is photoelectrically read.

In the same manner, the LEDs for G and B light in the light source 56 are sequentially driven to emit the G and B light so that a G image and a B image of this frame are read.

When the reading of one frame ends, the carrier 62 carries a frame to be read next in the film F to the reading position, where the film F is stopped. Images photographed on the frame are read. This operation is repeated until all the frames of the film F are read.

Here, the reading of each frame is performed twice, that is, each frame is read by fine scan which reads an image with a high resolution for an output of the photographic print 12b and pre-scan serving as image reading with a low resolution which is performed prior to the fine scan in order to determine reading conditions for the fine scan and image processing conditions in the image processing apparatus 44 (image processing section 90, etc.).

In the print system 40a carrying out the third aspect of the present invention, the scanner is not limited to the illustrated case, and all the publicly known scanners can be used.

Therefore, the scanner may be one for causing reading light for three primary colors to be incident on a film using a white light source and filters of the three primary colors instead of the LED light sources of three primary colors in the illustrated case. Further, instead of the scanner for reading by the surface exposure using the area CCD sensor, various publicly known means for reading films such as a film scanner for photoelectrically reading an image photographed on the film F through slit scanning may be used for the scanner.

Note that a reflection copy scanner for reading an image from a photograph (reflection copy) may be used instead of the scanner 42.

As described above, the digital image signal outputted from the scanner 42 is outputted to the image processing apparatus 44.

The image processing apparatus 44 performs predetermined image processing on an image signal sent from the scanner 42 or image data (image file) of an image photographed by a digital camera or the like to obtain image data for output.

Figure 7:
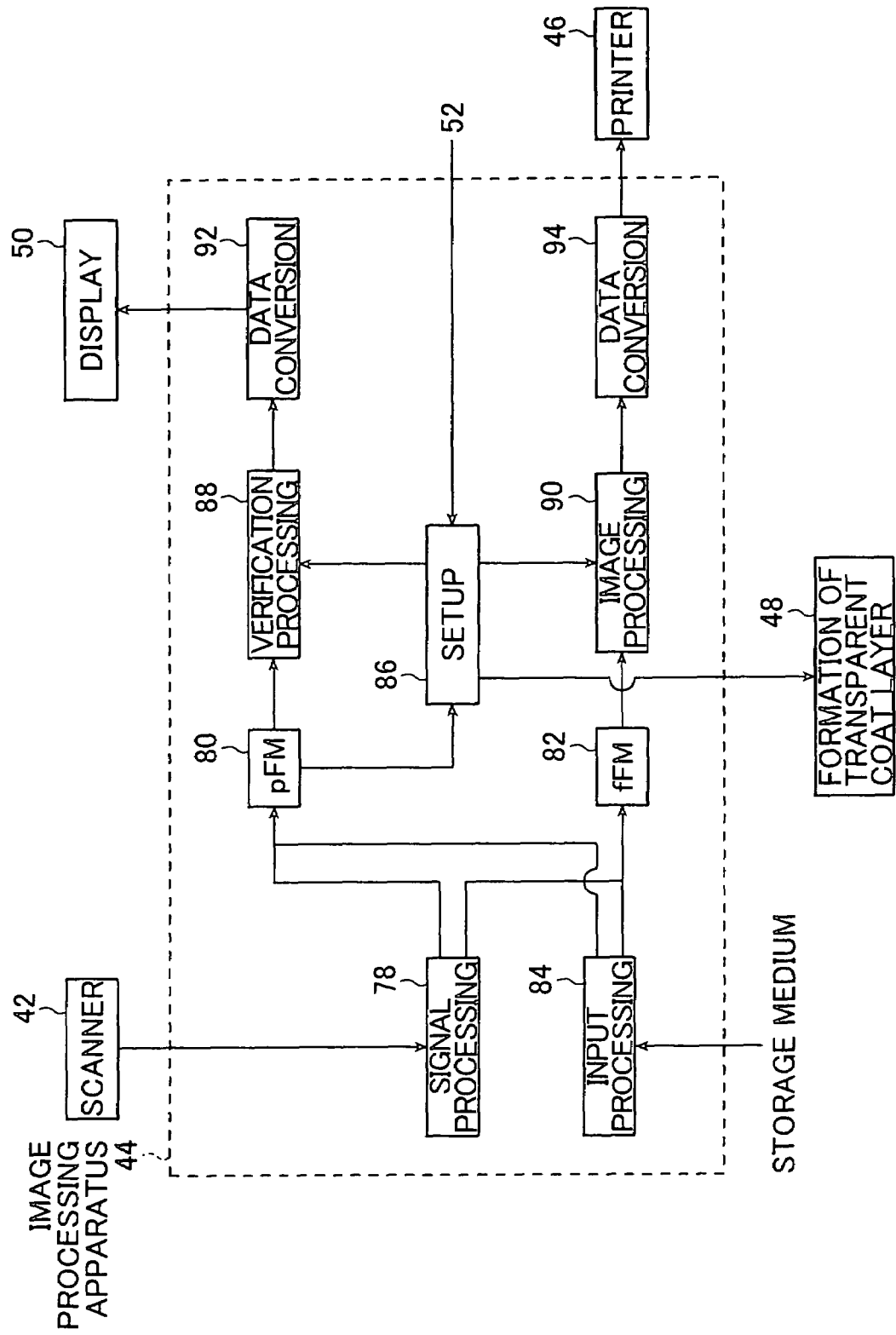
FIG. 7 is a block diagram of an embodiment of an image processing apparatus of the digital photo print system shown in FIG. 5.

As shown in a block diagram of FIG. 7, the image processing apparatus 44 of the illustrated case basically includes a signal processing section 78, a pre-scan (frame) memory 80, a fine scan (frame) memory 82, an input processing section 84, a setup section 86, a verification processing section 88, an image processing section 90, and data conversion sections 92 and 94.

In addition, as described above, a display 50 and an operation system 52 (a keyboard 52a and a mouse 52b) are connected to the image processing apparatus 44.

The image signal sent from the scanner 42 is sent to the signal processing section 78.

The signal processing section 78 applies predetermined signal correction such as dark current correction, DC offset correction, or shading correction to the supplied image signal, and then subjects the image signal to log conversion using a lookup table (hereinafter referred to as LUT) to obtain image (density) data.

The signal processing section 78 sends the processed pre-scan image data (hereinafter referred to as pre-scan data) and the processed fine scan image data (hereinafter referred to as fine scan data) to the pre-scan memory (hereinafter referred to as pFM) 80 and the fine scan memory (hereinafter referred to as fFM) 82, respectively, and the pFM 80 and the fFM 82 store the image data.

As described above, the print system 40a is a system which can also create the photographic print 12b and the high-quality print 10b from image data (image file) or the like of an image photographed by a digital camera.

The image data (image file) of an image photographed by a digital camera is usually stored in a recording medium such as a Smart Media™, a Compact Flash™, or a CD-R. In the case in which the photographic print 12b is created from this image data, the recording medium is read by not-shown reading means (media drive) connected to the print system 40a, and the image data is sent to the input processing section 84 of the image processing apparatus 44.

The input processing section 84 converts the supplied image data into image data compatible with the print system 40a, which is stored in the fFM 82 as fine scan data. In addition, the input processing section 84 thinned out the fine scan data to generate pre-scan data, which is stored in the pFM 80.

The setup section 86 reads out the pre-scan data stored in the pFM 80, performs image analysis, determines reading conditions for fine scan, and sends the determined reading conditions to the scanner 42. In addition, the setup section 86 determines image processing conditions in the verification processing section 88 and the image processing section 90. It is only necessary to set the reading conditions for fine scan and the image processing conditions by any publicly known method.

In addition, in the case in which an image is corrected by an operator at the time of verification, the setup section 86 corrects the image processing conditions in the verification processing section 88 and the image processing section 90 according to the correction of the image.

Moreover, in creating the high-quality print 10b, the setup section 86 performs area extraction of an image to extract objects forming the image and generates positional information on each object (area information of objects on the photographic print 12b). In addition, as described later, for an object for which a material is designated by the operator, the setup section 86 associates the positional information and material information thereof to generate formation information (asperities-forming information) of the transparent coat layer 14b and sends the forming information to the transparent coat layer forming means 48a.

It is only necessary to perform the area extraction with any publicly known method by image analysis making use of, for example, a method using hue, chroma, brightness, or the like, a method using continuity of pixels, or edge detection of an image. In addition, the area extraction may be performed according to cutout by the operator using a display image (e.g., verification image) on the display 50, or the image analysis and the cutout of the display image may be used in combination.

The verification processing section 88 reads out the pre-scan data from the pFM 80, applies predetermined image processing to the pre-scan data to obtain image data of a verification image (predicted finished image) (hereinafter referred to as verification image data), and sends the image data to the data conversion section 92. In addition, in the illustrated case, the verification image (verification screen) also serves as an input screen for giving an instruction for forming the transparent coat layer 14b. The verification processing section 88 creates a verification image such that designation of an object for which a material is designated in the transparent coat layer 14b and designation of various materials such as a cloth type material to be described later with respect to this object are performed with a GUI (Graphical User Interface) or the like.

Note that the image processing of the pre-scan data in the verification processing section 88 corresponds to generation of a verification image according to image processing in the image processing section 90 to be described later. The image processing conditions are basically the same as those in the image processing section 90.

The data conversion section 92 supplied with the verification image data, converts the verification image data into image data compatible with image display on the display 50, using three-dimensional (3D)-LUT or the like, and displays the converted image data on the display 50 as a verification image.

On the other hand, the image processing section 90 reads out the fine scan data from the fFM 82, applies the image processing to the fine scan data to obtain image data corresponding to an output image such as a print image (hereinafter referred to as output image data), and sends the processed image data to the data conversion section 94 or the like.

The image processing applied by the image processing section 90 is not specifically limited, and electronic magnification processing (enlargement/reduction processing), gradation conversion, color/density correction, sharpness processing, dodging processing (compression processing of image density dynamic range), and the like are illustrated.

Using the 3D-LUT or the like, the data conversion section 94 converts the output image data supplied from the image processing section 90 into image data compatible with image recording by the printer 46 (exposure of a photosensitive material (photographic paper)).

The image data converted by the data conversion section 94 is outputted to the printer 46. In the print system 40a, the printer 46 is a publicly known digital photographic printer.

An exemplary printer is a printer (printer/processor) consisting of a printing machine for exposing a photosensitive material (photographic paper) and a developing machine (processor) for applying processing to the exposed photosensitive material. The printing machine modulates the R, G, and B light beams in accordance with the image data outputted from the image processing apparatus 44 (data conversion section 94) and deflects the light beams in the main scanning direction to make them incident on a predetermined recording position. At the same time, the printing machine conveys the photosensitive material to this recording position in the sub-scanning direction perpendicular to the main scanning direction to thereby two-dimensionally scan and expose the photosensitive material to record a latent image. On the other hand, the development machine receives the exposed photosensitive material from the printing machine, applies predetermined wet-type processing including development, bleaching/fixing, and washing to the photosensitive material, dries the photosensitive material, and outputs it as the (finished) photographic print 12b.

In the print system 40a of the illustrated embodiment, in the case of ordinary photographic print creation, the photographic print 12b is directly outputted from the printer 46. On the other hand, in the case in which the print creation method of the present invention is carried out to create the high-quality print 10b, the photographic print 12b outputted by the printer 46 is supplied to the transparent coat layer forming means 48a.

Note that a method of supplying the photographic print 12b to the transparent coat layer forming means 48a is not specifically limited. The operator may mount the photographic print 12b on a predetermined position of the transparent coat layer forming means 48a, or the photographic print 12b may be automatically supplied from the printer 46 to the transparent coat layer forming means 48a using publicly known conveying means for a sheet-like object.

The transparent coat layer forming means 48*a* forms the transparent coat layer 14*b* on the surface of the photographic print 12*b* to obtain the high-quality print 10*b*.

As described above, the transparent coat layer 14*b* has, in an area of an object forming an image, fine asperities conforming to a material of the object to thereby represent textures of the object forming the image (since the photographic print 12*b* is used in the illustrated case, a subject is the object).

The transparent coat layer forming means 48*a* forms the transparent coat layer 14*b* having asperities conforming to a designated material in an area of a designated object in accordance with formation information (positional information and material information) of the transparent coat layer 14*b* sent from the setup section 86.

Here, the transparent coat layer 14*b* is not limited to one which is formed on a surface of a recording medium such as the photographic print 12*b* or a printed material (image recording surface). For example, it is also possible to form a glossy layer, a matte layer, or the like on a surface of an image material and to form the transparent coat layer 14*b* thereon.

In addition, the transparent coat layer 14*b* may be formed by covering the entire surface of the recording medium such as the photographic print 12*b* (entire area of the image recording surface) to have asperities conforming to a material only in a designated area. Alternatively, the transparent coat layer 14*b* may be formed in correspondence with only an area of an object in an image, or may be formed in correspondence with only an area of an object for which a material is indicated by the operator as described later. Moreover, the transparent coat layer 14*b* is not limited to one which covers the whole of an area where the layer 14*b* is to be formed, and a lower surface such as the image recording surface may be partially exposed from the transparent coat layer 14*b*. In addition, the transparent coat layer 14*b* may be formed in an uneven shape by forming a large number of independent projected portions.

In the illustrated case, four types of materials, namely, a metal type material, a resin type material, a cloth type material, and a wood type material, are set as the material for an object. The shape of the asperities for each material is set in advance as asperities shape data in the data table 54.

The transparent coat layer forming means 48*a* reads out the asperities shape data corresponding to a designated material from the data table 54 and forms the transparent coat layer 14*b* in a designated area (object) of the photographic print 12*b*.

Representation of textures by fine asperities of the transparent coat layer 14*b* is, as an example, performed by setting, for each material, one or more factors selected from difference of height in the asperities (Rz (maximum height) or Ra (arithmetic average roughness)), formation frequency of recessed portions or projected portions, formation density of the recessed portions and/or the projected portions, aggregation pattern of the recessed portions and/or the projected portions, and thickness of the transparent coat layer 14*b*.

More specifically, in the case of the metal type material, for example, if the transparent coat layer 14*b* with the Rz of 5 μm or less and the period of asperities of 100 to 200 μm is formed, textures of the material can be represented effectively.

In addition, in the case of the resin type material, for example, if the transparent coat layer 14*b* with the Rz of 2 μm or less and the period of asperities of 50 to 200 μm is formed, textures of the material can be represented effectively.

Further, in the case of the cloth type material, for example, if the transparent coat layer 14*b* with the Rz of 8 to 12 μm and the period of the asperities of 300 to 400 μm is formed, textures of the material can be represented effectively.

Moreover, in the case of the wood type material, for example, if the transparent coat layer 14*b* with the Rz of 10 to 15 μm and the period of the asperities of 200 to 400 μm is formed, textures of the material can be represented effectively.

In the illustrated case, such shape data of the asperities is stored in the data table 54 of the transparent coat layer forming means 48*a*.

In the present invention, the transparent coat layer forming means 48*a* is not specifically limited. Various types of means suitable for a material for use in forming the transparent coat layer 14*b* can be used as long as the transparent coat layer 14*b* having asperities conforming to materials of objects of an image in the photographic print 12*b* as described above can be formed.

As a preferred example, there is illustrated means for forming the transparent coat layer 14*b* using an ink jet image recording method. In this means, droplets of a material for forming the transparent coat layer 14*b* are ejected to form the transparent coat layer 14*b* in a designated area of each object while modulating the amount of ejection so that asperities conforming to a material of each designated object are formed.

The transparent coat layer forming means 48*a* according to this aspect and the transparent coat layer forming means 34 according to the second aspect of the present invention are different in that the transparent coat layer forming means 48*a* forms a transparent coat layer having asperities conforming to materials of objects of an image as the transparent coat layer 14*b*, whereas the transparent coat layer forming means 34 forms a transparent coat layer having asperities conforming to 3-D information (3-D positional information) of an image as the transparent coat layer 14*a*. However, to the method of forming the transparent coat layers can be applied similar methods as exemplified by an ink-jet printing method disclosed in JP 4-74193 B or the like, or a method in which a flat transparent coat layer made of a thermoplastic resin is formed and recesses are formed therein by means of "Millipede" which is the information recording technique developed by IBM Corporation. Thus, detailed descriptions of the method of forming the transparent coat layers will be omitted.

The thickness of the transparent coat layer 14*b* is not specifically limited and only has to be a thickness which does not disturb observation of an image according to a material forming the transparent coat layer 14*b*, a material of each object of an image, or the like.

The hard copy creation method of the present invention will be hereinafter described in more detail by explaining actions of the print system 40*a*.

When the film F is set in the carrier 62 of the scanner 42 and an instruction for starting an operation is inputted, the carrier 62 carries the film F and sets a frame to be read first (usually, a first frame) in a predetermined reading position.

Subsequently, as described above, the light source 56 is driven, the reading light of R, G, and B is sequentially emitted, the pre-scan for roughly reading an image is performed, and then the reading conditions for the fine scan are supplied from the setup section 86. Then, the reading light of R, G, and B is sequentially emitted again, the fine scan is performed, and an image of this frame is read by the reading section 66.

When reading of one frame ends, the carrier 62 carries the next frame of the film F to the reading position, and image reading for this frame is performed in the same manner as described above. After that, frames of the film F are sequentially read one by one.

An image signal read by the reading section 66 is amplified by the amplifier 68, and is then converted into a digital image signal by the A/D converter 70 and is sent to the image processing apparatus 44.

In the image processing apparatus 44, first, predetermined correction processing such as dark current correction is applied to the supplied image signal in the signal processing section 78, and then the image signal is subjected to log conversion into digital image data. Pre-scan data and fine scan data thereof are stored in the pFM 80 and the fFM 82, respectively.

When the pre-scan data is stored in the pFM 80, the setup section 86 reads out the pre-scan data, performs image analysis, sets reading conditions for fine scan, and sends the reading conditions to the scanner 42. In addition, the setup section 86 sets image processing conditions for this frame (image) in the verification processing section 88 and the image processing section 90.

In addition, in the case in which the high-quality print 10b is to be created, the setup section 86 performs area extraction of an image to extract objects forming the image and generates positional information on each object. Note that, as described above, the objects may be extracted according to cutout or the like by the operator.

When the image processing conditions are set, the verification processing section 88 reads out the pre-scan data from the pFM80, applies image processing to the pre-scan data to obtain verification image data, and sends the verification image data to the data conversion section 92. The data conversion section 92 converts the supplied verification image data into image data for display so that the display 18 can display the image data for display as a verification image.

When the verification image is displayed, the operator performs verification and, if necessary, corrects the image (corrects the image processing conditions). Note that the verification is performed by a publicly known method using a GUI or the like. The setup section 86 changes the image processing conditions in the verification processing section 88 and in the image processing section 90 based on the correction of the image through the verification.

In addition, in the case in which the high-quality print 10b is to be created, materials of objects forming an image are designated following the verification.

Figure 8:
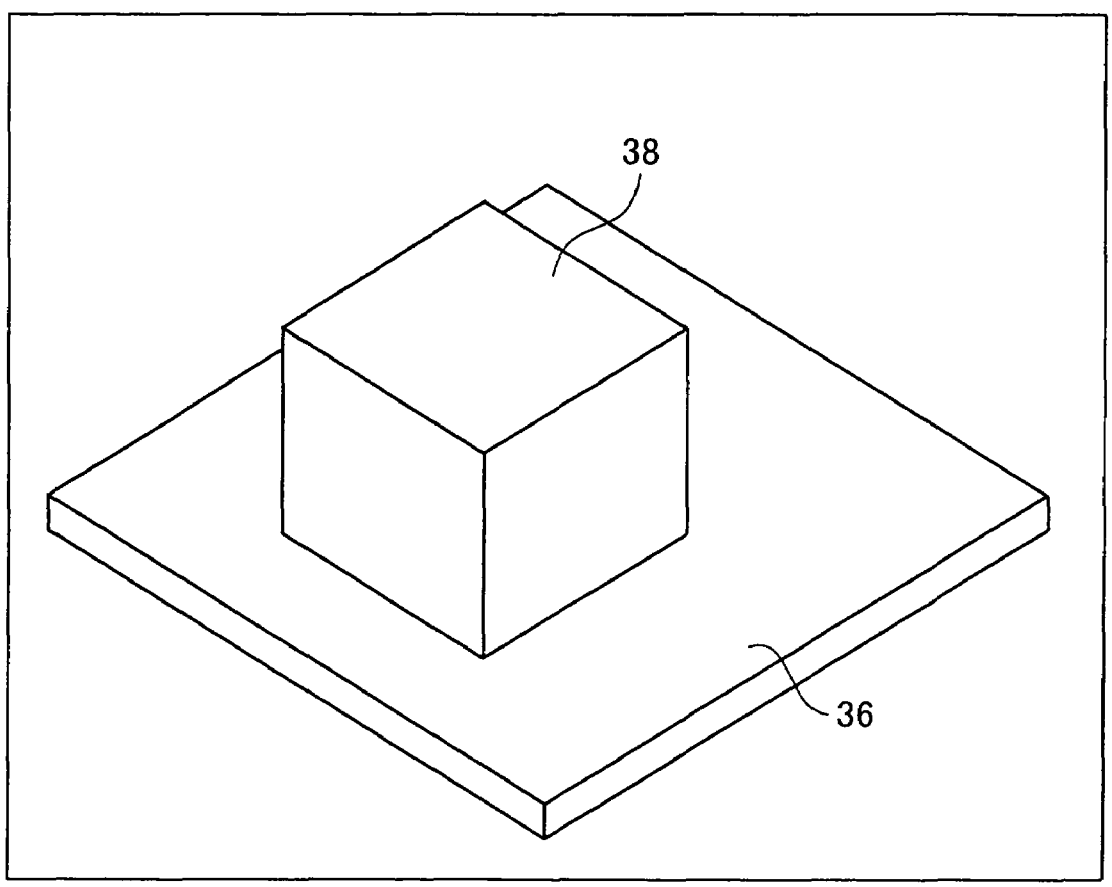
FIG. 8 is a schematic diagram for explaining the hard copy creation method according to the third aspect of the present invention.

As an example, it is assumed that the image is an image as shown in FIG. 8 in which a rectangular parallelepiped 38 with cloth spread on its surface is mounted on a base 36 made of wood. Accordingly, it is assumed that, for example, the operator designates the base 36 by clicking with the mouse 52b, subsequently selects and designates a wood type material as a material of the base 36, designates the rectangular parallelepiped 38, and designates a cloth type material as a material of the rectangular parallelepiped 38 in the same manner. As described above, it is only necessary to designate objects and materials by publicly known means such as a GUI, and the designation of materials does not have to be performed for all the objects.

Here, in the print system 40a for carrying out the present invention, it is preferable to change a display state of the verification image as well using an extraction result such that the operator can easily confirm that a material has been designated in an object (area) for which the material was designated.

More specifically, there is preferably illustrated a method of holding texture information for representing textures of materials in a display image on the display 50 in a form of a table in accordance with various materials and changing a texture of an image so as to represent textures more sharply in a corresponding region in accordance with the designation of a material.

Alternatively, in addition to the above, an image may be changed so as to be highlighted by a method such as thickening an edge portion of an object for which a material was designated, coloring the edge portion, or changing a color of the object.

When the image (frame) has passed the verification and the designation of materials has ended, output of this frame is instructed, image processing conditions for this frame are determined, and subsequently verification of the next image (next frame) is performed.

In addition, the setup section 86 associates positional information on the base 36 with information on the wood type material and further associates positional information on the rectangular parallelepiped 38 with information on the cloth type material according to the output instruction, and sends these pieces of information to the transparent coat layer forming means 48a as formation information on the transparent coat layer 14b.

An output instruction is issued when the verification is OK. In response to this output instruction, the image processing section 90 reads out fine scan data for a corresponding frame, performs image processing according to the determined image processing conditions, and sends the fine scan data to the data conversion section 94 as output image data.

The data conversion section 94 converts this output image data into image data compatible with image recording by the printer 46, and sends the image data to the printer 46.

The printer 46 to which the image data has been supplied from the data conversion section 94, two-dimensionally scans and exposes a photosensitive material with light beams modulated in accordance with this image data, and forms a latent image on the photosensitive material in the printing machine. The printer 46 subsequently applies predetermined wet-type processing to the exposed photosensitive material and dries the photosensitive material in the development machine, and outputs the photosensitive material as the photographic print 12b.

In the case in which the high-quality print 10b is to be created, the photographic print 12b outputted by the printer 46 is supplied to the transparent coat layer forming means 48a.

When the photographic print 12b is supplied, the transparent coat layer forming means 48a reads out asperities shape data for a corresponding material, in the illustrated case, asperities shape data for the wood type material and the cloth type material, from the data table 54 based on the formation information on the transparent coat layer 14b supplied from the setup section 86.

Moreover, the transparent coat layer forming means 48a forms the transparent coat layer 14b with the uneven shape of the wood type material in the area of the base 36 on the photographic print 12b and the transparent coat layer 14b with the uneven shape of the cloth type material in the area of the rectangular parallelepiped 38 on the photographic print 12 based on the formation information on the transparent coat layer 14b. Then, the transparent coat layer forming means 48*a* outputs the photographic print 12*b* as the (finished) high-quality print 10*b*.

The association of the formation information on the transparent coat layer 14*b* with the photographic print 12*b* need only be performed by a publicly known method. Exemplary methods include a method of associating the formation information with the photographic print 12*b* in an order of supplying the formation information and the photographic print 12*b*; and an association method including giving ID information to the formation information, recording this ID information on the back of the photographic print 12*b*, and reading the recorded ID information with the transparent coat layer forming means 48*a*.

As described above in detail, according to the third and the fifth aspects of the present invention, it is possible to obtain a high-quality hard copy in which textures of the objects are represented preferably.

The hard copy and the hard copy creation method according to the third and fifth aspects of the present invention are basically constituted as described above.

A hard copy and a hard copy creation method according to a fourth and a sixth aspects of the present invention will be hereinafter described with reference to FIGS. 9 and 10.

Figure 9:
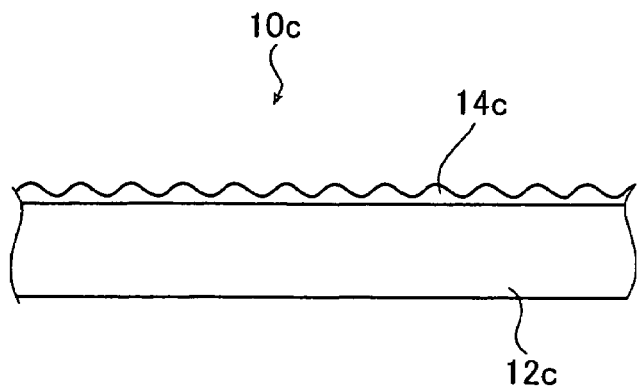
FIG. 9 is a sectional view schematically showing an example of a hard copy (high-quality print) according to a fourth and sixth aspects of the present invention.

FIG. 9 shows a schematic sectional view of an example of a high-quality print which is the hard copy according to the sixth aspect of the present invention created by applying the hard copy creation method according to the fourth aspect of the present invention to a photographic print.

A high-quality print 10*c* shown in FIG. 9 is created as a hard copy by the hard copy creation method according to the fourth aspect of the present invention and is basically constituted by forming a transparent coat layer 14*c*, as an upper layer, on an image recording medium serving as a base and having recorded therein an image such as a photographic print 12*c*. In addition, this transparent coat layer 14*c* has fine asperities corresponding to the density variation of the image recorded in the recording medium.

Consequently, the present invention realizes a high-quality hard copy such as a high-quality print in which surface characteristics of objects forming the image are preferably reproduced and textures are preferably represented.

The high-quality print 10*c* shown in FIG. 9 is different from the high-quality print 10*b* shown in FIG. 4 in the following respect. That is, the transparent coat layer 14*b* has fine asperities conforming to materials of objects forming an image recorded in the photographic print 12*a*, whereas the transparent coat layer 14*c* has fine asperities corresponding to surface characteristics of objects forming an image recorded in the photographic print 12*c*. However, since both the high-quality print 10*c* and the high-quality print 10*b* have the same constitution except this difference, detailed descriptions of the components having the same names are omitted, and the difference is mainly described.

Figure 10:
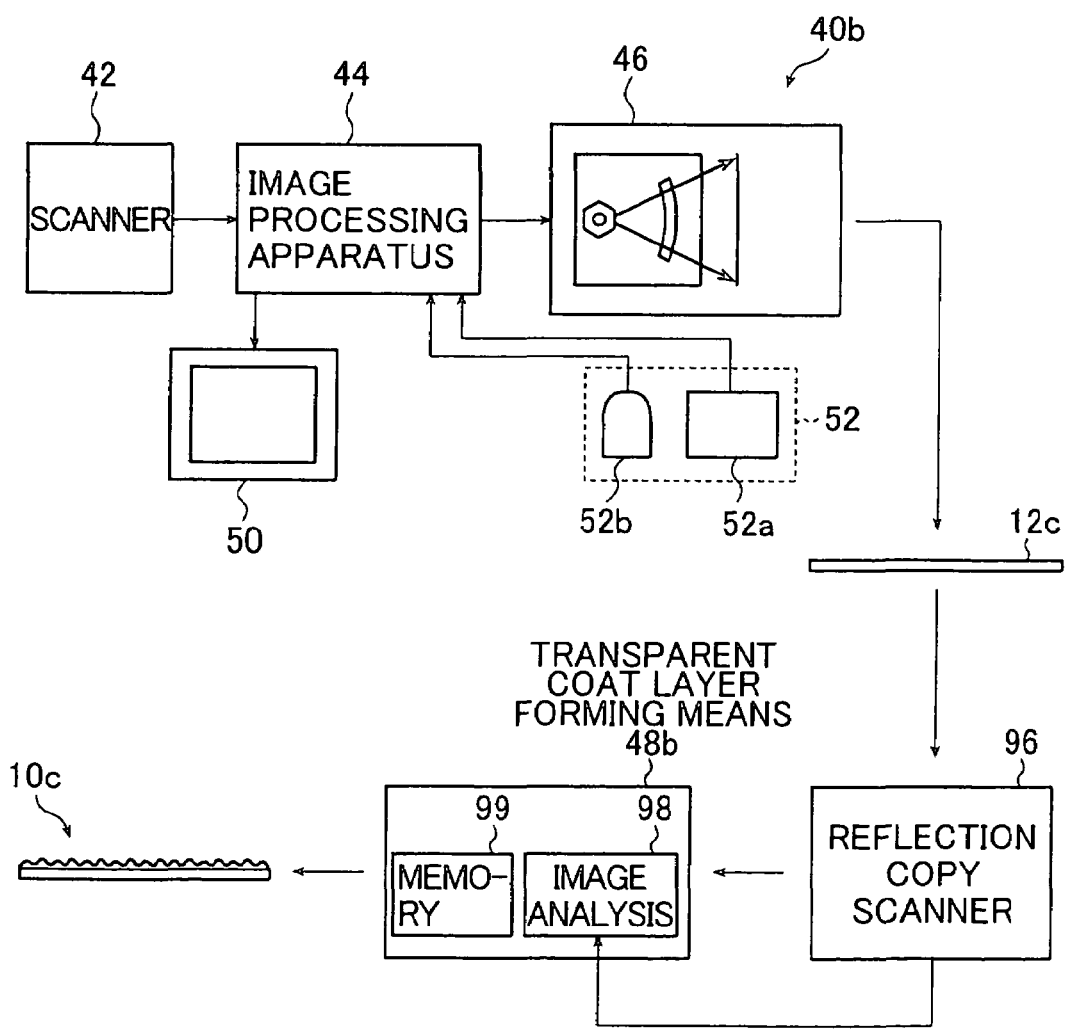
FIG. 10 is a block diagram of an embodiment of a digital photo print system carrying out an embodiment of a hard copy creation method according to the fourth aspect of the present invention.

FIG. 10 shows a block diagram of an embodiment of a digital photo print system which carries out the hard copy creation method according to the fourth aspect of the present invention to create the high-quality print.

A digital photo print system 40*b* shown in FIG. 10 photoelectrically reads an image photographed on a (photograph) film or acquires image data (image file) of an image photographed by a digital camera or the like, outputs the photographic print 12, and forms the transparent coat layer 14*c* on the photographic print 12 to create the high-quality print 10*c* according to the creation method of the present invention. The print system 40*b* basically includes a film scanner 42, an image processing apparatus 44, a printer 46, a reflection copy scanner 96, and transparent coat layer forming means 48*b*.

The print system 40*b* shown in FIG. 10 has the same structure as that of the print system 40*a* shown in FIG. 4 except that the print system 40*b* includes the reflection copy scanner 96 and the transparent coat layer forming means 48*b* instead of the transparent coat layer forming means 48*a*. Thus, the identical components are denoted by the identical reference numerals, and detailed descriptions of the components are omitted. In addition, both the transparent coat layer forming means 48*a* and 48*b* are different in that the transparent coat layer forming means 48*a* and 48*b* form corresponding transparent coat layers 14*b* and 14*c*, respectively. However, the transparent coat layer forming means 48*a* and 48*b* form the same transparent coat layer except for fine asperities formed on the surface. Thus, detailed descriptions of the means are omitted, and the difference is mainly described.

The print system 40*b* of the illustrated case is a system which can also create the photographic print 12*c* and the high-quality print 10*c* from image data (image file) or the like of an image photographed by a digital camera as in the print system 40*a*.

In this case, image data is directly supplied from the digital camera to the image processing apparatus 44 or image data read from a recording medium such as a Smart Media or a CD-R is supplied to the image processing apparatus 44. The image processing apparatus 44 applies predetermined processing to the image data to convert the image data into image data of a format compatible with the print system 40*b*. After that, the print system 40*b* performs processing in the same manner as in the print system 40*a*.

In the print system 40*b* of the illustrated case, as in the print system 40*a* shown in FIG. 4, in normal photographic print creation, the photographic print 12*c* is directly outputted from the printer 46. On the other hand, when the print creation method according to the fourth aspect of the present invention is carried out to create the high-quality print 10*c*, an image of the photographic print 12*c* outputted by the printer is read by the reflection copy scanner 96 and the transparent coat layer 14*c* is created in the transparent coat layer forming means 48*b* on the photographic print 12*c* from which the image was read.

In relation to handling or the like of the photographic print 12*c*, the reflection copy scanner 96 and the transparent coat layer forming means 48*b* are preferably formed integrally. However, the present invention is not limited to this, and the reflection copy scanner 96 and the transparent coat layer forming means 48*b* may be formed separately.

The reflection copy scanner 96 is a scanner for reading an image recorded in the photographic print 12*c* by making reading light incident on the photographic print 12*c* and photoelectrically reading reflected light. In other words, the reflection copy scanner 96 is a scanner for obtaining (two-dimensional) image data for the image recorded in the photographic print 12*c*.

As the reflection copy scanner 96, any publicly known image reading means for a reflection copy can be used as long as the means has sufficient resolution (spatial resolution and gradation resolution). For example, the reflection copy scanner 96 may be a reading apparatus of a flat bed type or a reading apparatus of a drum scanner type. In addition, image scanning means may be arranged in a photographic print output position of the printer 46 so that image data for the image recorded in the photographic print 12*c* can be obtained.

Further, the reflection copy scanner 96 may be a scanner for reading a color image or a scanner for reading a monochrome image.

A result of reading the image of the photographic print 12c by the reflection copy scanner 96 is sent to the transparent coat layer forming means 48b (image analysis section 98). In addition, as described above, the photographic print from which the image has been read by the reflection copy scanner 96, is also supplied to the transparent coat layer forming means 48b.

The transparent coat layer forming means 48b forms the transparent coat layer 14c on the surface of the photographic print 12c to obtain the high-quality print 10c.

As described above, the transparent coat layer 14c has, in the surface of an object forming an image, fine asperities corresponding to the density variation. Accordingly, light reflectivity given to the photographic print 12c is partially different and light reflectivity can be reproduced within the image surface, thereby representing textures of the object forming the image.

The transparent coat layer 14c is not limited to one which is formed on the surface of the recording medium such as the photographic print 12c or a printed material (image recording surface) as in the illustrated case. For example, a glossy layer or a matte layer may be formed on the image recording surface before forming the transparent coat layer 14c is formed thereon.

In addition, the transparent coat layer 14c may be formed so as to cover the entire surface of the recording medium such as the photographic print 12c (entire area of the image recording surface), or may be formed only in an area in which the degree of the density variation to be described later exceeds a certain reference value. Moreover, the transparent coat layer 14c is not limited to one which covers the whole of an area where the layer 14c is to be formed, and a lower surface such as the image recording surface or the like may be partially exposed from the transparent coat layer 14c. In addition, the transparent coat layer 14c may be formed in an uneven shape by forming a large number of independent projected portions.

In the transparent coat layer forming means 48b, first, the image analysis section 98 analyzes the image data for the photographic print 12c supplied from the reflection copy scanner 96, and extracts areas forming surfaces (surface areas) from an image.

A method of extracting the surface areas is not specifically limited. A method using hue, chroma, brightness, or the like, a method using continuity of pixels, edge detection or outline extraction of an image, or any other known methods can be used.

Subsequently, the image analysis section 98 detects the density variation (density value variation) for each extracted surface area.

A method of detecting the density variation is not specifically limited, and various methods can be used. For example, when the reflection copy scanner 96 is a monochrome reading apparatus, the density variation of each surface area can be detected using an output density value.

On the other hand, when the reflection copy scanner 96 is a color reading apparatus such as a color scanner, there is illustrated a method of calculating a density value of each pixel using a density $D_V$ calculated by an expression "$D_V = \alpha D_R + \beta D_G + \gamma D_B$ ($\alpha$, $\beta$, and $\gamma$ are coefficients determined appropriately)", wherein $D_R$, $D_G$, and $D_B$ indicate an R density, a G density, and a B density of each pixel, to detect the value variation. Alternatively, an average value of $D_R$, $D_G$, and $D_B$ of each pixel may be calculated to detect the density variation regarding the average value as the density value of the pixel. In addition, a colorimetric value of L*a*b* of each pixel may be calculated from the result of the density measurement performed by the reflection copy scanner 96 to thereby detect the variation in the value of the luminance L* of each pixel as the density variation.

Subsequently, the image analysis section 98 evaluates the magnitude of the density variation of each surface area from the detected density variation.

A method of evaluating the density variation of the surface area is not specifically limited either. For example, the magnitude of the density variation need only be evaluated using a mean deviation or a standard deviation.

The transparent coat layer forming means 48b forms the transparent coat layer 14c such that, based on the density variation of surface areas of an image, the magnitude of fine asperities in a surface area with a larger density variation become larger, whereas that of fine asperities in a surface area with a smaller variation become smaller. Consequently, the surface characteristics of objects forming a recorded image can be reproduced preferably to represent textures thereof.

In other words, in the present invention, characteristics of the surface of a real image of a recorded image (in the case of a photograph, a subject) (hereinafter the surface is referred to as a subject surface for conveniences' purpose) are estimated using the density variation of surface areas of the image, and the size of the fine asperities of the transparent coat layer 14c for each surface area is adjusted according to the estimated characteristics, thereby representing textures of the subject surface.

A surface area with a larger density variation in the image recorded in the photographic print 12c or the like can be judged as a subject surface with a larger surface unevenness or a subject surface with a higher diffuse reflectance. Therefore, the transparent coat layer 14c is formed on the photographic print 12c or the like, and, in the surface area with a larger density variation, the unevenness of fine asperities of the transparent coat layer 14c corresponding to the surface area is increased. Consequently, the transparent coat layer 14c can be made diffusion reflective according to the surface unevenness or diffuse reflectance of the subject surface to represent textures of the subject surface preferably.

In addition, for example, the frequency analysis is performed for the density value variation of a certain surface in the image analysis section 98, and concerning a surface in which a specific frequency component is found characteristically strong, it is preferable to use a frequency characteristic of formation of fine asperities or to a frequency corresponding to a constant multiple of the characteristic frequency. Consequently, characteristics of the surface can be emphasized more effectively.

Conversely, a surface area with a smaller density variation in the image can be judged as a surface area with smaller surface unevenness or a nearly flat surface area with a larger number of specular reflection components. Therefore, the transparent coat layer 14c is formed on the photographic print 12c or the like, and, in the surface area with a smaller density variation, the unevenness of the fine asperities of the transparent coat layer 14c in the surface area is decreased accordingly or is completely eliminated, whereby the transparent coat layer 14c can be made nearly specular reflective so that the textures of the subject surface can be represented preferably.

In the present invention, a method of controlling the size of the fine asperities of the transparent coat layer 14c is not specifically limited, and the size of the fine asperities can be controlled by various methods.

As an example, the size of the fine asperities of the transparent coat layer 14c need only be controlled according to one or more of criteria including: difference of height in the asperities (e.g., Rz (maximum height) and/or Ra (arithmetic average roughness)); formation frequency of recessed portions and/or projected portions; formation density of the recessed portions and/or the projected portions; aggregation pattern of the recessed portions and/or the projected portions; and thickness of the transparent coat layer 14c.

In the present invention, the size or the like of the fine asperities to be formed in the transparent coat layer 14c is not specifically limited, and only has to be determined appropriately according to the type or size of the photographic print 12c (hard copy), the material for use in forming the transparent coat layer 14c, or the like. As an example, it is preferable to adjust Ra in the range of 1 to 20 μm, in particular 2 to 10 μm, and Rz in the range of 5 to 50 μm, in particular 8 to 35 μm.

In the illustrated example, a relation between the density variation of surface areas and the size (e.g., Rz or Ra) of the fine asperities of the transparent coat layer 14c corresponding to the density variation is stored in a memory 99 in the form of a lookup table (LUT) in advance.

The transparent coat layer forming means 48b determines the size of the fine asperities of the transparent coat layer 14c for each surface area using this LUT. Moreover, in correspondence with each surface area of an image recorded in the photographic print 12c, the transparent coat layer 14c is formed such that the fine asperities of the transparent coat layer 14c for each surface area have a determined size, and the photographic print 12c is outputted as the high-quality print 10c.

In the present invention, as in the transparent coat layer forming means 48a shown in FIG. 4, the transparent coat layer forming means 48b is not specifically limited, and various means can be used in accordance with the material forming the transparent coat layer 14c.

The transparent coat layer forming means 48b according to this aspect and the transparent coat layer forming means 48a according to the third aspect of the present invention are different in the following respect. That is, the transparent coat layer forming means 48b forms a transparent coat layer having asperities corresponding to surface characteristics of objects of an image as the transparent coat layer 14c, whereas the transparent coat layer forming means 48a forms a transparent coat layer having asperities conforming to materials of objects of an image as the transparent coat layer 14b. However, to the method of forming the transparent coat layers can be applied similar methods as exemplified by an ink-jet printing method disclosed in JP 4-74193 B or the like, or a method in which a flat transparent coat layer made of a thermoplastic resin is formed and recesses are formed therein by means of "Millipede" which is the information recording technique developed by IBM Corporation. Thus, detailed descriptions of the method of forming the transparent coat layers are omitted.

The print system 40b of the illustrated case reads an image recorded in the photographic print 12c with the reflection copy scanner 96 to acquire (two-dimensional) image data for the image. Then, the print system 40b analyzes this image data to thereby detect the density variation of surface areas forming the image and to form the transparent coat layer 14c having fine asperities of sizes corresponding to the respective surface areas.

According to this aspect of the present invention, the high-quality hard copy according the present invention, which has a different light reflecting property for each area of an image, can be created even from a hard copy which has already been outputted.

However, the present invention is not limited to this. As a form which does not require image reading of a hard copy, the creation method for a hard copy of the present invention may be carried out by performing extraction of surface areas and detection of density variation by analyzing two-dimensional image data such as image data read by the scanner 42 or image data photographed by a digital camera.

For example, in the print system 40b shown in FIG. 10, without providing the reflection copy scanner 96, sent to the transparent coat layer forming means 48b is image data for recording for outputting the photographic print 12c (or image data of a photographic print to be recorded in a recording medium such as a CD-R), the image data being generated by the image processing apparatus 44 from image data acquired by reading a photograph film in the scanner 42.

In addition, in an image pickup apparatus such as a digital camera, a recording medium having recorded therein image data acquired by the image pickup apparatus, or a recording medium such as a CD-R having recorded therein image data outputted before, as described above, the image processing apparatus 44 applies predetermined processing to image data read out from the image pickup apparatus or the recording media to obtain image data for recording for outputting a photographic print or the like. Thus, similarly, this image data is sent to the transparent coat layer forming means 48b.

In the transparent coat layer forming means 48b, in the same manner as described above, the image analysis section 98 perform image analysis or the like of the supplied image data to extract surface areas forming the image, further detect the density variation of each surface, and form the transparent coat layer 14c having fine asperities of sizes corresponding to the respective surface areas to obtain the high-quality print 10c.

In such a case, the following method is also possible: The image processing apparatus 44 performs image analysis or the like and sends positional information on surface areas and information on sizes of fine asperities of the respective surface areas (or information on density variation) to the transparent coat layer forming means 48b, and the transparent coat layer forming means 48b forms the transparent coat layer 14c according to these pieces of information.

In addition, in the illustrated case, the photographic print 12c is read by the reflection copy scanner 96 to calculate the density variation from image data for the photographic print 12c. However, the present invention is not limited to this. For example, the density variation may be calculated as two-dimensional image data by measuring the amount of reflected light from the photographic print 12c (recording medium) or measuring the luminance of the reflected light by a luminance meter.

As described above in detail, according to the fourth and sixth aspects of the present invention, a high-quality hard copy in which textures of objects of an image (subject surface) are preferably represented, can be created.

The hard copy and the hard copy creation method according to the fourth and sixth aspects of the present invention are basically constituted as described above.

The hard copy according to the first, fifth and sixth aspects of the present invention and the creation methods for a hard copy according to the second to fourth aspects of the present invention have been described in detail. However, it goes without saying that the present invention is not limited to the above-mentioned embodiments, and various improvements and alterations may be made to the present invention without departing from the gist of the present invention.

For example, in the above-mentioned embodiments according to the aspects of the present invention, the transparent coat layer 14a, 14b, or 14c is formed on the image recorded recording medium (photographic print) 12a, which is outputted by the printer 32, or on the photographic print 12b or 12c, which is outputted by the digital photo print system 40a or 40b, by the transparent coat layer forming means 34, 48a, or 48b to obtain the hard copy (high-quality print) 10a or the high-quality print 10b or 10c.

However, the present invention is not limited to this. As described above, as a recording medium to be a base, various recording media such as a printed material and a print in which an image is recorded by ink jet system can be used as well as the photographic print. In addition, image recording and formation of a transparent coat layer may be performed by an identical method as recording an image with ink jet system while forming a transparent coat layer also with ink jet system.

Moreover, when the recording of an image in a recording medium and the formation of a transparent coat layer are performed by an identical recording method, a hard copy may be created by the creation method of the present invention without separately providing transparent coat layer forming means, for example, by performing the image recording and the formation of a transparent coat layer by one ink-jet printer.

What is claimed is:

1. A hard copy creation method comprising:
   recording an image on a recording medium on a side of an image recording surface; and
   forming a transparent coat layer, having asperities, on a designated area of said image recording surface, wherein the asperities are formed using shape data of describing the asperities, wherein the shape data corresponds to the textures of materials of objects forming said images, wherein said recording step is performed by modulating an image recording unit according to digital image data, and an image obtained by reproducing said digital image data as a visible image is displayed for indication of said designated area, and
   wherein formation of said transparent coat layer with respect to said designated area is performed according to a result of area extraction by analysis of said digital image data.

2. The hard copy creation method according to claim 1, wherein said shape data describing said asperities is created in correspondence with one or more of a texture of metal type material, a texture of resin type material, a texture of cloth type material, and a texture of wood type material.

3. The hard copy creation method according to claim 1, wherein said shape data describing said asperities has one or more of information concerning a difference of height in said asperities of said transparent coat layer, a formation frequency of said asperities of said transparent coat layer, a formation density of said asperities of said transparent coat layer, a coagulation pattern of said asperities of said transparent coat layer, and a thickness of said transparent coat layer.

* * * * *